Dec. 5, 1950 F. E. SCOTT 2,532,518
FERTILIZER SOWER ATTACHMENT FOR TRACTORS
Filed July 21, 1948 2 Sheets-Sheet 1

Freer E. Scott
INVENTOR.

BY *Clarence A. O'Brien*
*and Harvey B. Jacobson*
Attorneys

Dec. 5, 1950            F. E. SCOTT            2,532,518
FERTILIZER SOWER ATTACHMENT FOR TRACTORS
Filed July 21, 1948            2 Sheets-Sheet 2
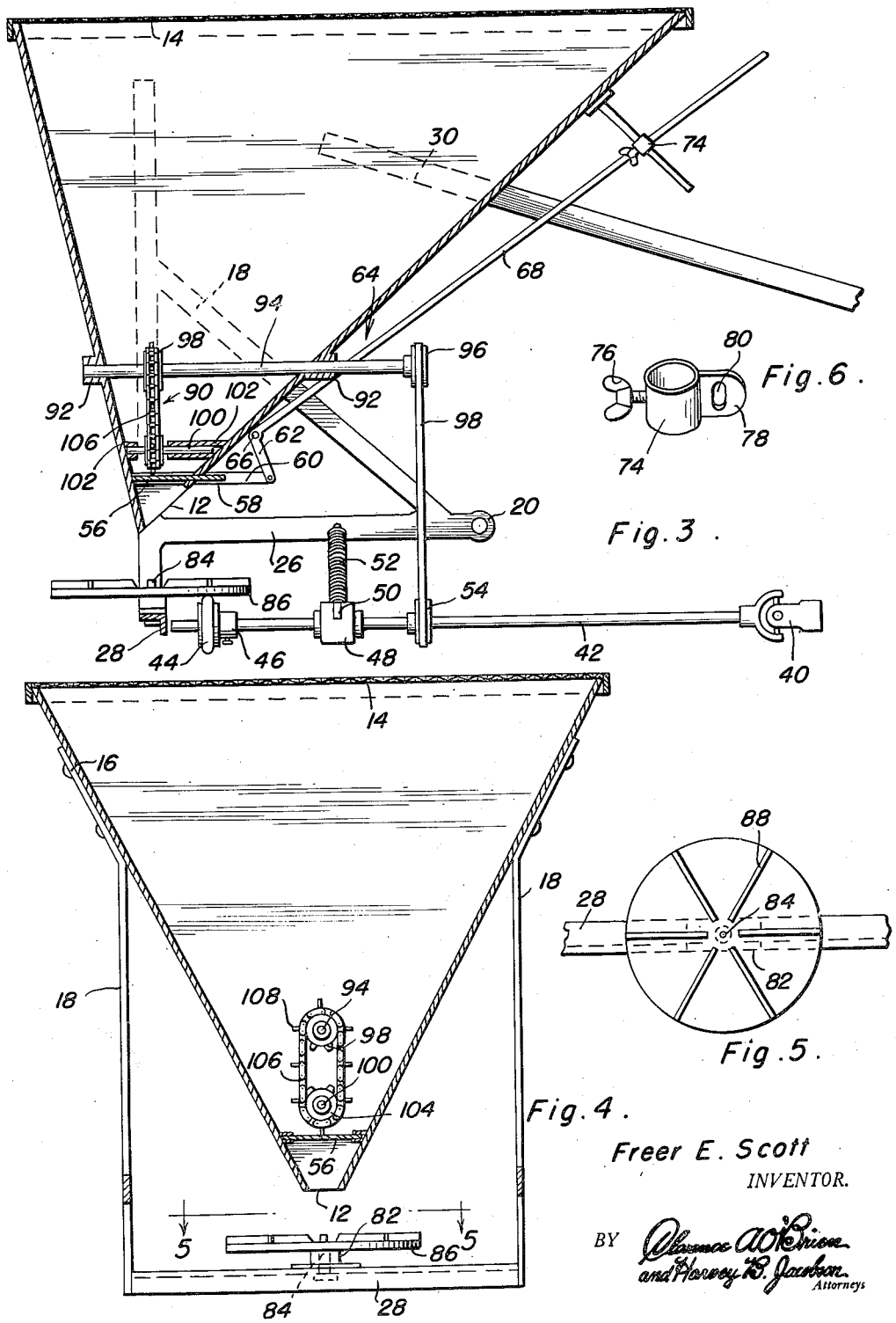
Freer E. Scott
INVENTOR.

Patented Dec. 5, 1950

2,532,518

UNITED STATES PATENT OFFICE 2,532,518

FERTILIZER SOWER ATTACHMENT FOR TRACTORS

Freer E. Scott, Hammondsport, N. Y.

Application July 21, 1948, Serial No. 39,920

4 Claims. (Cl. 275—8)

This invention relates to a novel attachment for a tractor whereby fertilizer may be effectively and evenly delivered to the soil.

The primary object of this invention is to provide a fertilizer sower which can be readily attached to and detached from a tractor and which derives power from the power take-off of the latter for driving a conveyor and rotary dispenser of the fertilizer.

Yet another object of this invention is to provide a fertilizer sower which is detachably and pivotally mounted upon the frame and drawbar of a tractor and which includes a hand-operated lever-actuated mechanism for adjustably varying the fertilizer delivery outlet.

A further object of this invention is to provide a fertilizer sower attachment including a V-shaped hopper detachably secured to a tractor having a fertilizer outlet at its bottom, means for adjustably varying the opening of said outlet, means beneath said outlet for receiving and dispersing fertilizer, and means in said hopper driven by the power take-off of the tractor for conveying fertilizer to the outlet and eventually to the disperser.

These, together with various ancillary objects and features of the invention which will later become apparent as the following description proceeds, are attained by the device, a preferred embodiment of which has been illustrated by way of example only in the accompanying drawings, wherein:

Figure 3 is a sectional view taken on the line 3—3 of Figure 2;

Figure 4 is a sectional view taken on the line 4—4 of Figure 1;

Figure 5 is a fragmentary plan view of the dispersing element; and,

Figure 6 is a perspective view of the clamp employed in connection with the lever-actuated means for varying the opening of the outlet in the hopper.

Figures 1, 2:
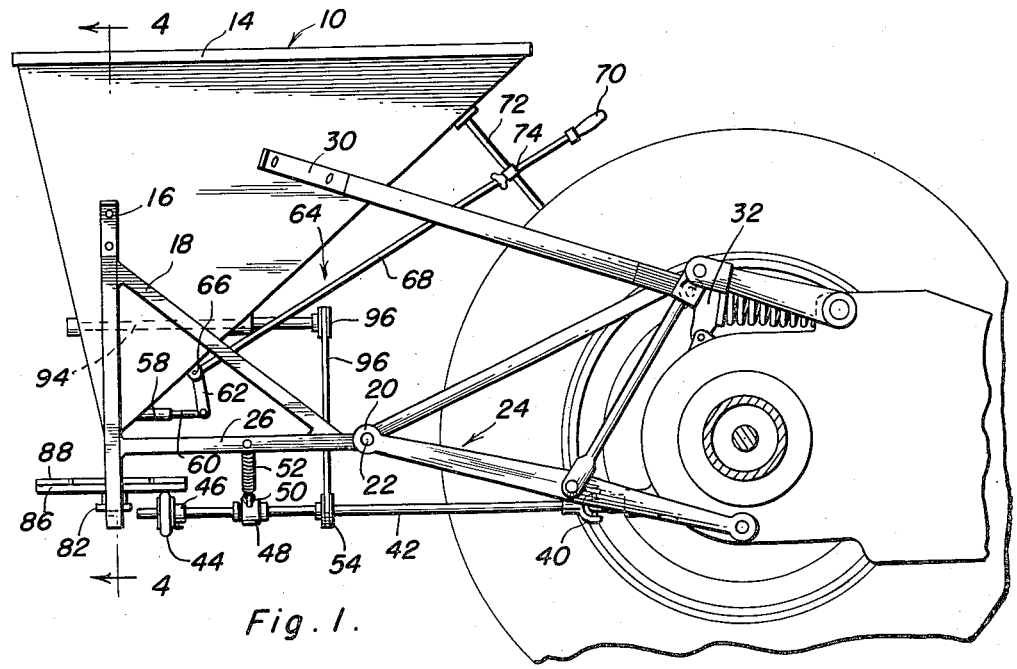
Figure 1 is a side elevational view of the attachment on a tractor.
Figure 2 is a top plan view of the attachment shown in Figure 1.

Specific reference is now made to the drawings. In the several views in the accompanying drawing and in the following specification reference characters indicate corresponding elements throughout. Indicated generally at 10 is a generally V-shaped hopper having a fertilizer discharge outlet 12 at the bottom of the converging sides and a removable screen 14 at the top thereof. Secured to opposing side walls by means of bolts 16 are a pair of right triangular supports 18 which are provided at the forward ends with eyes 20 for engageably retaining pins 22 whereby the supports are pivoted upon tractor frame members 24. The frame members are preferably of angle iron construction. At their bottom ends, the forward leg portions 26 of the supports 18 are connected by a transversely extending bar or angle 28.

As further support for the hopper, a pair of downwardly and forwardly inclined supports 30 are provided which are pivotally secured at their forward ends to another tractor frame portion 32. The frames 24 and 32 are conventional and are pivoted to the housing of axle 34 of a tractor 36 and common, in particular, to Ford tractors.

Connected to the rear power take-off 38 by means of a universal joint 40 is a power take-off shaft 42 to the free end of which is secured a rubber roller 44 held in position thereon by means of a collar clamp 46. Adjacent the roller the shaft 42 is urged upwardly and resiliently supported by means of a collar 48 having a pair of apertured upstanding lugs 50. Secured to each of the lugs is a vertically disposed coil spring 52 which is secured at its upper ends to the frame member 26 intermediate the ends thereof. The springs 52 normally urge the shaft 42 in an upward direction. Intermediate the ends of the shaft 42 is secured a sheave 54 for a purpose to be set forth later.

Extending transversely of the hopper and adjacent the outlet 12 is a partition 56 which is slidable in a sleeve 58 extending out of a side wall of the hopper. Extending through the sleeve and secured to the end of the partition is a link 60, the free end of which is pivoted to the extremity of the shorter leg 62 of an L-shaped lever arm 64 which is pivoted at its corner 66 to an apertured lug extending from a side wall of the hopper. The longer arm 68 of the lever terminates in a handle portion 70. Adjacent the screened end of the hopper, an angulated rod 72 is provided upon which is slidably mounted a collar clamp 74 having a set screw 76 and a depending apertured lug 78. The lever arm 68 extends through the aperture 80 of the apertured lug 78. Thus, as the handle 70 is slid up or down the rod 72, the partition is accordingly and adjustably opened and closed as desired.

Rotatable in the frame member 28 intermediate its ends and secured thereto by means of a bearing 82 is a stub shaft 84 upon which is mounted a rotary disc 86. It will be seen that the disc is immediately beneath the fertilizer outlet 12. Mounted on the disc are suitable dispersing fins 88. Thus, when the fertilizer descends upon the rotary disc the fins disperse the fertilizer. The rotary disc 86 is driven by the roller or wheel 44 which is urged into contact with the undersurface of the disc by means of the springs 52.

To properly agitate the fertilizer in the hopper and convey it to the bottom thereof, a conveyor 90 is provided. In suitable bearings 92 at opposite end walls of the hopper a first shaft 94 is supported which extends through a wall of the hopper and which carries at its free end a pulley 96. A belt 98 drivingly interconnects sheave 54 on the power take-off shaft with the pulley 96. Positioned within the hopper and secured to the shaft 94 is a first sprocket 98. Beneath the shaft 94 is another parallel shaft 100 which extends through the interior of the hopper and is rotatably supported on the end walls thereof by means of bearings 102. Intermediate the ends of the second shaft 100 is secured a second sprocket 104 and entrained over both sprockets is an endless conveyor chain 106 having fertilizer agitator and conveyor links 108. Thus, as the power shaft 42 rotates it simultaneously spins the dispersing fins 88 and drives the first conveyor shaft 94 which in turn drives the second conveyor shaft 100. The fertilizer in the hopper is both agitated and conveyed down to the partition 56 which when adjustably opened by the lever 64 will permit fertilizer to impinge upon the rotary disc 86 for dispersal to the soil therefrom.

In view of the foregoing description taken in conjunction with the accompanying drawings, it is believed that a clear understanding of the device will be quite apparent to those skilled in this art. A more detailed description is accordingly deemed unnecessary.

It is to be understood, however, that even though there is herein shown and described a preferred embodiment of the invention, the same is susceptible to certain changes fully comprehended by the spirit of the invention as herein described and the scope of the appended claims.

Having described the invention, what is claimed as new is:

1. A fertilizer sower attachment for a tractor having a rear power take-off shaft and drawbar comprising a hopper detachably secured to the tractor frame and drawbar, having a fertilizer outlet at the bottom, means for adjustably varying the opening of said outlet, means beneath said outlet for receiving and dispersing fertilizer, further means for conveying fertilizer to said outlet, said further means including a first shaft rotatably journalled in said hopper, means drivingly interconnecting said first shaft with said power take-off shaft, a second shaft rotatably journalled in said hopper beneath said first shaft, sprockets secured to said first and second shafts, and an endless conveyor about said sprockets.

2. The combination of claim 1 wherein said first mentioned means includes a transversely extending partition slidable in said hopper above said outlet and lever means for actuating said partition.

3. The combination of claim 2 wherein said second mentioned means includes a rotor adjustably secured beneath said outlet, fins on said rotor, a shaft universally pivoted to said power take-off having a wheel at the rear end thereof, and resilient means urging said wheel into frictional engagement with said rotor for driving the latter.

4. In a fertilizer sower including a hopper having a discharge outlet, said hopper being adapted for attachment to a tractor having a power take-off; a means for receiving and dispersing fertilizer comprising a spreader disk having upstanding radial fins journaled for horizontal rotation beneath said outlet, a shaft universally pivoted to the power take-off, a friction roller removably secured adjacent the free end of said shaft and disposed beneath said disk, and resilient means normally urging said friction roller into engagement with said disk, said resilient means including a collar on said shaft and a spring terminally secured to said collar and the hopper.

FREER E. SCOTT.

REFERENCES CITED

The following references are of record in the file of this patent:

UNITED STATES PATENTS

| Number | Name | Date |
|--------|------|------|
| 200,750 | Nix et al. | Feb. 26, 1878 |
| 321,030 | Hutchison | June 30, 1885 |
| 323,683 | Hotham | Aug. 4, 1885 |
| 2,065,361 | Blake | Dec. 22, 1936 |
| 2,293,977 | Hoffstetter | Aug. 25, 1942 |